United States Patent [19]

Rogers

[11] 4,426,317

[45] Jan. 17, 1984

[54] PROCESS FOR MAKING OLEFIN POLYMERIZATION CATALYST

[75] Inventor: Thomas K. Rogers, Greenville, S.C.

[73] Assignee: Cities Service Company, Tulsa, Okla.

[21] Appl. No.: 444,295

[22] Filed: Nov. 24, 1982

[51] Int. Cl.$^3$ .............................. C08F 4/02; C08F 4/68
[52] U.S. Cl. .................................... 502/120; 502/154; 502/150
[58] Field of Search ............... 252/429 B, 429 C, 428, 252/430

[56] References Cited

U.S. PATENT DOCUMENTS

| | | | |
|---|---|---|---|
| 4,148,754 | 4/1979 | Strobel et al. | 252/429 C |
| 4,263,171 | 4/1981 | Shida et al. | 252/429 C |
| 4,333,851 | 6/1982 | Spearman et al. | 252/429 B |

FOREIGN PATENT DOCUMENTS 1489410 10/1977 United Kingdom.

*Primary Examiner*—Patrick Garvin
*Attorney, Agent, or Firm*—Patricia J. Hogan

[57] ABSTRACT

Olefin polymerization catalysts of the type prepared by (1) drying an inorganic oxide, such as silica, having surface hydroxyl groups to remove adsorbed water, (2) slurrying the dried inorganic oxide in an inert liquid hydrocarbon, such as a hydrocarbon boiling in the $C_4$–$C_8$ range, (3) reacting the surface hydroxyl groups of the dried inorganic oxide with an organometallic compound, such as a trialkylaluminum, and (4) reacting the thus-treated support with a vanadium compound, such as vanadium oxytrichloride, are made reproducibly uniform at commercial scale by modifying the catalyst syntheses so as to (a) conduct the reactions with agitation in an amount of inert liquid hydrocarbon such as to provide a weight/unit volume solids content of about 10 to 50% and (b) add the vanadium compound to the agitated slurry of treated inorganic oxide particles at a rate such as to ensure substantially uniform coverage of those particles with the vanadium compound as it reacts therewith. In a preferred embodiment of the invention, the organometallic compound is also added to the agitated slurry at a rate such as to ensure substantially uniform coverage of the inorganic oxide particles with the organometallic compound as it reacts with the surface hydroxyl groups.

27 Claims, No Drawings

PROCESS FOR MAKING OLEFIN POLYMERIZATION CATALYST

BACKGROUND OF THE INVENTION

1. Field of the Invention

This invention relates to the polymerization of olefins and more particularly relates to catalyst compositions useful for polymerizing ethylene, alone or together with one or more comonomers, to semi-crystalline resins.

2. Description of the Prior Art

It is known that catalysts of the type variously described as coordination, Ziegler, Ziegler-type, or Ziegler-Natta catalysts are useful for the polymerization of olefins under moderate conditions of temperature and pressure. It is also known that (1) the properties of the polymers obtainable by the use of such catalysts, as well as the relative economies of the processes used to prepare the polymers, vary with many factors, including the choice of the particular monomers, catalyst components, polymerization adjuvants, and other polymerization conditions employed, (2) gas-phase polymerization processes offer economic advantages over slurry and solution processes, and (3) supported catalysts are particularly desirable because of their utility in gas-phase, slurry, and solution polymerization processes.

British Pat. No. 1,489,410 (Monsanto) teaches polymerization processes, at least some of which are commercially attractive because of their use of supported Ziegler catalysts having a vanadium component and other factors, most notably their ability to be conducted by gas-phase, slurry, or solution techniques. However, attempts to make Monsanto's vanadium compound/organoaluminum compound/silica catalysts, or similar vanadium compound/organometallic compound/inorganic oxide catalysts, on a commercial scale by the various techniques taught in the Monsanto patent have met with varying degrees of success, both from the aspect of the type and quality of the product produced and from the aspect of the commercial acceptability of the technique used to prepare the catalysts.

Although it is believed that it should be possible to prepare satisfactory vanadium compound/organometallic compound/inorganic oxide catalyst compositions by any of the techniques taught by Monsanto, experience has shown that the various techniques which Monsanto indicates to be equivalent are not equivalent in scaled-up processes. For example, in scaled-up processes:

(1) preparation of the catalyst compositions by depositing a vanadium compound/aluminum hydrocarbyloxide/trialkylaluminum formulation on a treated silica support does not lead to the formation of chemically-combined supported catalyst compositions, whereas chemically-combined supported catalyst compositions are prepared when the compositions are prepared by reacting the vanadium compound with the treated support, (2) preparation of the chemically-combined supported catalyst compositions by Monsanto's vapor deposition technique usually leads to the formation of a black-specked, non-uniform product and is also commercially undesirable because of the technique's requiring the use of vapors that would endanger operators working in the area and therefore necessitate the installation of expensive pollutant-removing equipment, (3) preparation of the chemically-combined supported catalyst compositions by another of Monsanto's supposedly equivalent techniques, i.e., addition of a solution of the vanadium compound to a dry treated support, also leads to the formation of a non-uniform product, and (4) preparation of the chemically-combined supported catalyst compositions by the last of Monsanto's supposedly equivalent techniques, i.e., adding a solution of the vanadium compound to a slurry of treated support, is unreliable in the production of a uniform product and, as described in the patent, uses a large amount of hydrocarbon medium which requires accommodation by correspondingly large equipment, high energy costs for evaporation of the medium, and pollution-abatement means.

What is still neeeded is a reproducible, commercially-available process for preparing uniform chemically-combined vanadium compound/organometallic compound/inorganic oxide catalyst compositions—both compositions of the type taught by Monsanto and compositions of other types, e.g., those containing additional components.

SUMMARY OF THE INVENTION

An object of the invention is to provide novel processes for the preparation of vanadium compound/organometallic compound/inorganic oxide catalyst compositions useful for the polymerization of olefins.

Another object is to provide such processes which consistently result in the formation of uniform products.

A further object is to provide such processes which are commercially acceptable.

These and other objects are attained by incorporating certain modifications into a previously-developed process for preparing such olefin polymerization catalyst compositions, specifically:

(A) in a process for preparing an olefin polymerization catalyst composition by:

(1) drying an inorganic oxide having surface hydroxyl groups to form a support that is substantially free of adsorbed water, (2) slurrying the dried inorganic oxide in an inert liquid hydrocarbon, (3) reacting the surface hydroxyl groups of the dried inorganic oxide with at least about 0.5 mol, per mol of surface hydroxyl groups, of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both have values of 0 to 2, the sum of which is not greater than 3x, and (4) reacting the thus-treated support with at least about 0.001 mol, per mol of organometallic compound, of at least one vanadium compound wherein the vanadium has a valence of at least +3, (B) THE IMPROVEMENT WHICH COMPRISES:

(a) conducting the reactions with agitation in an amount of inert liquid hydrocarbon such as to provide a weight/unit volume solids content of about 10 to 50% and (b) adding the vanadium compound to the agitated slurry of treated inorganic oxide particles at a rate such as to ensure substantially uniform distribution of the vanadium compound on the particles as it reacts therewith.

DETAILED DESCRIPTION

The inorganic oxide used in the practice of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia, and mixtures thereof, i.e., physical mixtures, such as mixtures of silica and alumina particles, etc., and/or chemical mixtures, such as magnesium silicate, aluminum silicate, etc. The surface hydroxyl groups may be at the outer surfaces of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorgnic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square maters per gram, preferably about 100 to 400 square meters per gram; and a pore volume of about 0.5 to 3.5 cc per gram, preferably about 0.5 to 2 cc per gram.

The inert liquid hydrocarbon in which the inorganic oxide is slurried may be any inert liquid hydrocarbon, but it is generally one that has a boiling point sufficiently low to permit its subsequent removal from the reaction mixture by evaporation at moderate temperatures. Saturated hydrocarbons boiling in the $C_4-C_8$ range are particularly suitable as the slurry medium, so it is most commonly a pure or commercial $C_4-C_8$ alkane or cycloalkane, such as isobutane, pentane, isopentane, hexane, cyclohexane, heptane, isooctane, etc., and mixtures thereof with one another and/or with other materials commonly present in commercial distillation cuts having the desired boiling range.

As indicated above, the organometallic compound that is reacted with the surface hydroxyl groups of the inorganic oxide in the practice of the invention may be any one or more organometallic compounds corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3x. Thus, M may be, e.g., aluminum, gallium, indium, or thallium; R may be, e,g., methyl, ethyl, propyl, isopropyl, n-butyl, isobutyl, n-pentyl, isopentyl, t-pentyl, hexyl, 2-methylpentyl, heptyl, octyl, 2-ethylhexyl, nonyl, decyl, dodecyl, etc.; R', when present, may be H, Cl, an alkyl group, such as one of these exemplified above for R, which is the same as or different from R, or an alkoxy group, such as the alkoxy groups corresponding to the aforementioned alkyl groups; and R'', when present, may be any of the substituents mentioned above as exemplary of R' and may be the same as or different from R'.

The preferred organometallic compounds are those in which M is aluminum. Utilizable aluminum compounds include chlorides, such as dimethylaluminum chloride, diethylaluminum chloride, dipropylaluminum chloride, diisobutylaluminum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isopropenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixturs of such compounds.

Especially preferred aluminum compounds are the trialkylaluminums, particularly triethylaluminum and tri-n-hexylaluminum, which are advantageous to employ because of their cost, availability, and/or effectiveness.

The amount of organometallic compound employed is at least about 0.5 mol per mol of surface hydroxyl groups on the inorganic oxide. There is no maximum to the amount of organometallic compound that may be employed, since (1) any amount in excess of the amount capable of reacting with the surface hydroxyl groups can be removed from the catalyst compositions in any instance wherein the presence of unreacted organometallic compound might have a detrimental effect on a polymerization process in which one of the catalyst compositions is to be used and (2) it may sometimes be desirable to use excess organometallic compound in order to ensure complete reaction of the surface hydroxyl groups therewith. Generally, an excess is not preferred because washing may be required if an excess is used. In general, the amount of organometallic compound reacted with the inorganic oxide varies with the molecular weight distribution desired for polymers to be prepared in the presence of the catalyst compositions—smaller amounts of organometallic compound being utilized when broad molecular weight distributions are desired, and larger amounts, i.e., at least one mol per mol of surface hydroxyl groups, being employed when narrower molecular weight distributions are desired.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide the desired molar ratio of organometallic compound to available hydroxyl groups.

The vanadium component of the catalyst compositions prepared by the process of the invention, like the vanadium component of the Monsanto catalyst compositions, is one or more vanadium compounds in which the vanadium has a valence of at least $+3$. It may be any such reducible vanadium compound, e.g., any of the vanadium compounds taught by Monsanto or in other prior art relating to Ziegler catalysts. However, in a preferred embodiment of the invention, it is any one or more compounds corresponding to a formula selected from $(RO)_nVOX_{3-n}$ and $(RO)_mVX_{4-m}$, wherein R represents a monovalent hydrocarbon radical that contains 1 to 18 carbon atoms and is free of aliphatic unsaturation, X is Cl or Br, n has a value of 0 to 3, and m has a value of 0 to 4. Thus, the preferred vanadium compounds include $VOCl_3$, $VOBr_3$, and the indicated mono-, di-, and trihydrocarbyloxy derivatives thereof, as well as $VCl_4$, $VBr_4$, and the indicated mono-, di-, tri-, and tetrahydrocarbyloxy derivatives thereof; and R, when present, may be a straight- or branched-chain alkyl, cycloalkyl, aryl, alkaryl, or aralkyl group, such as methyl, ethyl, propyl, isopropyl, butyl, isobutyl, pentyl, hexyl, cyclohexyl, heptyl, octyl, cyclooctyl, nonyl, decyl, dodecyl, hexadecyl, octadecyl, phenyl, benzyl, dimethylphenyl, ethylphenyl, etc. When mixtures of vanadium compounds are employed, the vanadium component may be a mixture of two or more compounds corresponding to either of the general formulas given above, a mixture of one or more compounds corresponding to one of these general formulas with one or more compounds corresponding to the other of those general formulas, or a mixture of two or more other vanadium compounds in which the vanadium has a valence of at least $+3$, etc.

Ordinarily, when a vanadium compound of the $(RO)_nVOX_{3-n}$ type is employed, it is preferably a compound wherein X is Cl because of the greater availability of such compounds. When the catalyst compositions are to be used in the production of polymers having relatively broad molecular weight distributions, it is generally preferred to use a vanadium compound in which n is 0; and, when the catalyst compositions are to be used in the production of polymers having narrower molecular weight distributions, it is generally preferred to use a vanadium compound in which R is alkyl and n has a value of about 1.

Ordinarily, when a vanadium compound of the $(RO)_mVX_{4-m}$ type is employed, it is preferably $VCl_4$ or a derivative thereof, most preferably $VCl_4$ itself.

The amount of vanadium compound(s) employed in the practice of the invention may be varied considerably but is generally such as to provide at least about 0.001 mol of vanadium compound per mol of organometallic compound. When the catalyst composition is to be prepared by a process wherein no washing step is utilized during or after preparation of the compositions, as is preferred in the practice of the invention, the amount of vanadium compound employed should not be substantially in excess of the amount capable of reacting with the treated support, i.e., about 1 mol of vanadium compound per mol of organometallic compound. Use of a greater amount would serve no practical purpose and could be disadvantageous in that the excess vanadium compound could lead to fouling of the polymerization reactor. However, a larger amount of vanadium compound may be employed when fouling of the reactor is not expected to be a problem and/or excess vanadium compound will be removed from the catalyst composition before the composition is used. In the practice of the invention, the amount of vanadium compound employed is generally not in excess of about 3 mols per mol of organometallic compound; and excellent results are obtained by the use of about 0.03 to 0.2 mol of vanadium compound per mole of organometallic compound, i.e., about 5 to 30 mols of organometallic compound per mol of vanadium compound.

The catalyst compositions prepared by the process of the invention may, of course, have components in addition to the essential components, i.e., the inorganic oxide, organometallic compound, and vanadium compound. Exemplary of such optional components are alcohols. When employed, these optional components are generally used in the same amounts as are utilized when they are included in vanadium compound/organometallic compound/inorganic oxide catalyst compositions prepared by prior art processes.

As indicated above, the processes which are improved in accordance with the present invention are processes in which the catalyst compositions are prepared by drying the inorganic oxide, slurrying it in an inert liquid hydrocarbon, reacting it with the organometallic compound, and then reacting the thus-treated support with the vanadium compound—the preferred processes being those in which no washing step is utilized during or after preparation of the compositions.

The conditions under which the inorganic oxide are dried are not critical as long as they are adequate to provide an inorganic oxide that has surface hydroxyl groups and is substantially free of adsorbed water. However, it is ordinarily preferred to dry the inorganic oxide at about 100°–1000° C., with or without a nitrogen or other inert gas purge, until substantially all adsorbed water is removed; and it is also generally preferred to select a drying temperature within the aforementioned temperature range that will be conducive to the formation of a support having the desired number of surface hydroxyl groups—temperatures of about 200°–600° C., for example, usually being chosen when supports contaning about 1.4–1.5 mmols of available hydroxyl groups per gram are desired. The time required for drying the inorganic oxide varies, of course, with the particular drying temperature used but is usually in the range of about 5–16 hours.

When the inorganic oxide has been substantially freed of adsorbed water, its surface hydroxyl groups may be reacted with the organometallic compound in any suitable manner consistent with the provisions of the present invention, conveniently by (1) adjusting its temperature, if necessary, to the temperature at which the reaction with the organometallic compound is to be conducted, (2) slurrying it in the inert liquid hydrocarbon, (3) adding the desired amount of organometallic compound in neat or solution form, and (4) maintaining the organometallic compound in intimate contact with the inorganic oxide for a time sufficient to ensure substantially complete reaction with as many of the available hydroxyl groups as can be reacted with the amount of organometallic compound employed, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium component with the treated support may also be accomplished by any means consistent with the provisions of the present invention. However, it is most desirably accomplished by adding the vanadium compound in neat or solution form to the slurry of treated support and maintaining it in intimate contact with the treated support for a time sufficient to provide for substantially complete reaction, usually at least about 5 minutes and preferably about 10-60 minutes, although, actually, the reaction is virtually instantaneous.

When optional components, such as those mentioned above, are to be used in preparing catalyst compositions by the process of the invention, they also may be reacted with the other components by any means consistent with the provisions of the present invention, ordinarily by adding them to the slurry at the appropriate time in neat or solution form and maintaining them in intimate contact with the particles in the slurry for a time sufficient to provide for substantially complete reaction therewith.

The manner in which the process of the invention differs from prior art processes for preparing vanadium compound/organometallic compound/inorganic oxide catalyst compositions is primarily in its control of the uniformity of the product by the use of conditions ensuring that uniformity, although the conditions are also designed to achieve the consistent formation of a uniform product in a commercially-acceptable way. Thus, as indicated above, the amount of inert liquid hydrocarbon employed in the process, i.e., the amount used to slurry the inorganic oxide plus any amount used as a solvent for the organometallic compound, vanadium compound, and/or any optional components, is limited to an amount that will provide a weight/unit volume solids content of about 10-50%, calculated by dividing the weight of solids in kilograms by the volume of liquid medium in liters and multiplying the quotient by 100. Also, the slurry is agitated throughout the reactions, and the vanadium compound is added to the agitated slurry at a rate such as to ensure substantially uniform distribution of the vanadium compound on the particles as it reacts therewith.

In accordance with a preferred embodiment of the invention, the rate of addition of the organometallic compound is also controlled so as to ensure its being substantially uniformly distributed on the particles in the slurry as it reacts therewith, although control of the rate of addition of the organometallic compound does not appear to be as important as controlling the rate of addition of the vanadium compound in order to achieve the consistent formation of uniform products.

The particular rates at which the organometallic and vanadium compounds should be added vary, of course, with the amount of inorganic oxide employed, the temperature conditions, and the reactivities of the particular organometallic and vanadium compounds used. However, they can be readily determined by routine experimentation, particularly in view of the specific examples presented below. As will be readily understood by those skilled in the art, the addition rates have to be at least relatively slow to ensure substantially uniform distribution of the reactants on the particles as they react therewith, but the rates do not have to be so slow that the process would be inefficient. For example, excellent results are obtained when the vanadium compounds are added at flow rates calculated from the equation:

$$F_r = (10^4 w F_c / VS)$$

wherein:
$F_r$ represents the flow rate of the vanadium component feed stream in cubic centimeters per minute,
w represents the weight of inorganic oxide support in kilograms,
V represents the volume percent of the vanadium component, calculated as $VOCl_3$, in the vanadium feed stream (i.e., the volume % that would be constituted by an equimolar amount of $VOCl_3$ when a different vanadium component is used),
S represents the percent solids content as previously defined, and
$F_c$ represents the flow constant, in reciprocal minutes, wherein this constant is about 0.01 to 0.1, preferably about 0.025 to 0.05.

Such rates, of course, are not too slow to make the process inefficient; and even faster rates, e.g., rates wherein the flow constant is up to about 0.2 or even higher, are permissible when the particular reactants being added are not too reactive to be substantially uniformly spread over the particles in the slurry as reaction occurs at the particular temperature being employed. It is generally found, however, that addition of the vanadium component at the faster rates that are permissible within the scope of the invention leads to the formation of catalyst compositions which are (a) more uniform than comparable catalyst compositions prepared by processes outside the scope of the invention but (b) somewhat less uniform than the catalyst compositions prepared by the inventive processes wherein the slower rates of addition are employed.

The aforementioned principles are also applicable to the rates of addition of the organometallic compounds in processes wherein it is desired to control the rate of addition of the organometallic compound, i.e., (a) any rate may be employed that permits the organometallic compound to be substantially uniformly distributed on the particles in the slurry as it reacts therewith, (b) the slower rates are apt to lead to more uniform distribution and therefore to more uniform products, (c) the faster rates can, however, lead to the formation of products that are more uniform than comparable catalyst compositions prepared by processes wherein the rate of addition is not controlled, and (d) the addition rates do not have to be so slow as to make the processes inefficient.

Like other processes for preparing Ziegler catalysts, the process of the invention should be conducted in the substantial absence of materials, such as oxygen, water, etc., that are known to reduce or destroy the effectiveness of Ziegler catalysts. This condition can be achieved, as in prior art processes, by the use of an inert gas atmosphere, such as nitrogen.

The process of the invention results in the formation of catalysts which, as is already known, are useful for the polymerization of ethylene, alone or together with one or more alpha-olefin comonomers, to form semi-crystalline polymers. Its particular advantage is that it provides a commercially-acceptable, reproducible method of forming uniform catalyst compositions, thus avoiding both (1) the severe pollution and cost problems inherent in other methods that might be used to prepare the catalysts so as to make them uniform and (2) the problems that can be created by the use of non-uniform polymerization catalyst compositions, such as lower activity, the formation of an unacceptable high percentage of fines, chunks, and oils, etc. However, it is also advantageous in that the entire process, i.e., the drying of the support, the slurrying of the support, and the addition and reaction of the other catalyst components, can be conducted in a single vessel, if desired; or the process can be conducted in more than one vessel, e.g., as is frequently preferred in commercial operations, two vessels—one vessel suitable for the quick, high-temperature drying and subsequent cooling of the inorganic oxide, and the other vessel suitable for the more moderate conditions used for the remainder of the process.

The process is useful in the preparation of all of the catalyst compositions described above but has particular utility in the preparation of these compositions wherein the amounts or organometallic and/or vanadium compounds employed are less than the amounts required to react with all of the reactive sites on the particles in the slurry to which they are added, since it is those compositions which are most apt to be non-uniform when made by prior art processes.

The following examples are given to illustrate the invention and are not intended as a limitation thereof. Unless otherwise stated each of the processes described in the examples is conducted in a nitrogen atmosphere to protect the catalysts from degradation by Ziegler catalyst poisons.

EXAMPLE I

Dry 3.8 kilograms of silica gel at 200° C., for about 12 hours to form a dried product containing about 1.4 mmols of surface hydroxyl groups per gram, and charge the dried product to a cylindrical vessel placed in a horizontal position and provided with a horizontal stirring shaft having a helical ribbon-type agitator attached thereto. Add about 24 liters of hexane to the vessel to provide a solids content of 15.8%. Slurry the silica gel in the hexane by rotating the agitator at about 60 rpm and maintain the agitation at that level.

Allow a solution of 420 cc of triethylaluminum in about four liters of hexane to flow into the reactor at a rate of about 820 cc per minute while maintaining agitation of the slurry, continue the agitation for about 30 minutes after completing addition of the solution, and then begin adding a solution of 36 cc of vanadium oxytrichloride in about 1.8 liters of hexane at a flow rate of about 39 cc per minute to provide a flow constant of about 0.028 while still agitating the slurry. After completing addition of the VOCl$_3$ solution, flush the VOCl$_3$ line with about 440 cc of hexane to ensure the completeness of the addition, at which point the solids content is about 13.5%. Continue agitation for another 30 minutes. Then flash the hexane from the catalyst at a temperature of 95°–100° C., allow the reactor to cool, and recover the catalyst as a free-flowing powder from the bottom of the reactor.

Examination of the catalyst under a microscope shows it to be substantially free of specks and substantially uniform in color. Use of the catalyst in preparing polyethylenes having different melt indices by slurry, solution, and gas-phase polymerization techniques proves it to be an active catalyst lacking the problems associated with non-uniform catalysts.

EXAMPLE II

Repeat Example I except for adding the VOCl$_3$ solution to the agitated slurry at a rate of about 159 cc per minute to provide a flow constant of about 0.11. Examination of the catalyst under a microscope reveals some of the particles to contain black specks and others to contain white specks, indicating a non-uniform reaction of the vanadium compound with the particles. When the catalyst is used to polymerize ethylene by a slurry, solution, or gas-phase technique, it is found to be reasonably satisfactory but to be less active than the catalyst of Example I and to result in the formation of more oils, as well as providing a less desirable polymer particle size distribution.

COMPARATIVE EXAMPLE A

Repeat Example I except for adding the VOCl$_3$ solution to the agitated slurry at a rate of about 320 cc per minute to provide a flow constant of about 0.23. Examination of the catalyst under a microscope reveals a salt-and-pepper effect that is even more pronounced than in the catalyst of Example II, i.e., even more of the particles contain black or white specks. When the catalyst is used to polymerize ethylene by a slurry, solution, or gas-phase technique, it is found to be usable but to be even less active than the catalyst of Example II and to result in the formation of even more oils, as well as providing a less satisfactory particle size distribution.

The preceding examples show that uniform vanadium compound/organometallic compound/inorganic oxide catalyst compositions are prepared by the process of the invention, that the compositions prepared by the process—though still reasonably uniform—become less uniform as the rate of addition of the vanadium compound is increased to a point where the vanadium compound is less uniformly distributed on the particles in the slurry as it reacts therewith, and that a point is reached at which the rate of addition of the vanadium compound is too rapid for it to be substantially uniformly distributed on those particles and permit the formation of uniform catalyst compositions. The following examples show that (1) the invention is useful in commercial-scale operations and (2) other inorganic oxides and/or vanadium compounds can be substituted for those used in the preceding examples.

EXAMPLE III

Dry 454 kilograms of silica gel in air at 200° C. for about 12 hours and cool under nitrogen to form a dried product containing about 1.4 mmols of surface hydroxyl groups per gram, and charge the dried product to a vessel of the type described in Example I. Add 1515 liters of hexane to provide a solids content of 30%, and slurry the silica gel therein by rotating the agitator. Allow 50.2 liters of neat triethylaluminum to flow into the reactor through two injection ports at a combined rate of about 1.7 liters per minute while maintaining agitation of the slurry, continue the agitation for about 30 minutes after completing that addition, and then begin adding 4.34 liters of neat vanadium oxytrichloride through another two injection ports at a combined flow rate of about 72 cc per minute to provide a flow constant of about 0.048 while still agitating the slurry. Continue agitation for another 30 minutes, flash the hexane from the catalyst at a temperature of about 95°–100° C., allow the reactor to cool, and recover the catalyst as a free-flowing powder from the bottom of the reactor.

Examination of the catalyst under a microscope shows it to be substantially free of specks and substantially uniform in color. Use of the catalyst in preparing polyethylenes, ethylene/propylene copolymers, and ethylene/butene-1 copolymers having different densities and melt indices by slurry, solution, and gas-phase polymerization techniques proves it to be an active catalyst lacking the problems associated with non-uniform catalysts.

EXAMPLE IV

Dry 3.8 kilograms of silica gel at 200° C. for about 12 hours to form a dried product containing about 1.4 mmols of surface hydroxyl groups per gram, and charge the dried product to the vessel described in Example I. Add about 24 liters of hexane to provide a solids content of 15.8%, and slurry the silica gel in the hexane by rotating the agitator. Allow 725 cc of neat triethylaluminum to flow into the reactor at a rate of about 180 cc per minute while maintaining agitation of the slurry, continue the agitation for about 30 minutes after completing that addition, and then begin adding a solution of 20 cc of vanadium tetrachloride in about 1.5 liters of hexane at a flow rate of about 270 cc per minute to provide a flow constant of about 0.15 while still agitating the slurry. Continue agitation for another 30 minutes. Then add 70 cc of hexanol at a rate of about 30 cc per minute, continue agitation for another 30 minutes, flash the hexane from the catalyst, allow the reactor to cool, and recover the catalyst as a free-flowing powder from the bottom of the reactor.

Examination of the catalyst under a microscope shows it to be substantially uniform, although some of the particles contain black specks and other particles contain white specks. Use of the catalyst in preparing ethylene polymers by slurry, solution, and gas-phase techniques proves it to be an active catalyst which is substantially free of the problems associated with non-uniform catalysts.

EXAMPLE V

Repeat Example IV except for (1) replacing the VCl$_4$ solution of that example with a solution of 28 cc of VCl$_4$ in about 1.5 liters of hexane, (2) adding the VCl$_4$ solution at a flow rate of about 230 cc per minute to provide a flow constant of about 0.18, and (3) employing 297 cc of glycol ether instead of the 70 cc of hexanol. Similar results are observed, though the catalyst is somewhat less uniform than the catalyst of Example IV.

EXAMPLE VI

Dry 4.4 kilograms of magnesia at 200° C. for about 12 hours to form a dried product containing about 1.4 mmols of surface hydroxyl groups per gram, and charge the dried product to the vessel described in Example I. Add about 24 liters of hexane to provide a solids content of 18.3%, and slurry the magnesia in the hexane by rotating the agitator. Allow a solution of 850 cc of triethylaluminum in 4.7 liters of hexane to flow into the reactor at a rate of about 160 cc per minute while maintaining agitation of the slurry, continue the agitation for about 30 minutes after completing addition of the solution, and then begin adding about 4.7 liters of a hexane solution containing about 1.8 volume % of n—C$_4$H$_9$OVOCl$_2$, calculated as VOCl$_3$, at a flow rate of about 120 cc per minute to provide a flow constant of about 0.09 while still agitating the slurry. Then add 270 cc of butanol at a rate of 30 cc per minute, continue agitation for another 30 minutes, flash the hexane from the catalyst, allow the reactor to cool, and recover the catalyst as a free-flowing powder from the bottom of the reactor.

Examination of the catalyst under a microscope shows it to be substantially free of specks and substantially uniform in color. Use of the catalyst in preparing polyethylenes, ethylene/propylene copolymers, and ethylene/butene-1 copolymers by slurry, solution, and gas-phase polymerization technique proves it to be an active catalyst lacking the problems associated with non-uniform catalysts.

Similar results in controlling the uniformity of vanadium compound/organometallic compound/inorganic oxide catalyst compositions are obtained when the examples are repeated except that the catalyst components, component proportions, inert liquid hydrocarbons, and flow rates specified in the examples are replaced with catalyst components, component proportions, inert liquid hydrocarbons, and flow rates taught to be their equivalents in the specification.

I claim:

1. In a process for preparing an olefin polymerization catalyst composition by:
   (1) drying an inorganic oxide having surface hydroxyl groups to form a support that is substantially free of adsorbed water,
   (2) slurry and dried inorganic oxide in an inert liquid hydrocarbon,
   (3) reacting the surface hydroxyl groups of the dried inorganic oxide with at least about 0.5 mol, per mol of surface hydroxyl groups, of at least one organometallic compound corresponding to the formula R$_x$MR$'_y$R''$_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3-x, and
   (4) reacting the thus-treated support with at least about 0.001 mol, per mol of organometallic compound, of at least one vanadium compound wherein the vanadium has a valence of at least +3, the improvement which comprises:
   (A) conducting the reactions with agitation in an amount of inert liquid hydrocarbon such as to provide a weight/unit volume solids content of about 10 to 50% and
   (B) adding the vanadium compound to the agitated slurry of treated inorganic oxide particles at a rate such as to ensure substantially uniform distribution of the vanadium compound on the particles as it reacts therewith.

2. The process of claim 1 wherein the catalyst composition preparation incorporating the improvement is one wherein there is no washing of the composition during or after its preparation.

3. The process of claim 1 wherein the inorganic oxide is dried in one vessel, and then transferred to another vessel in which the slurrying and reaction steps are conducted.

4. The process of claim 1 wherein the entire process is conducted in a single vessel.

5. The process of claim 1 wherein the vanadium compound is added at a rate such as to provide a flow constant of about 0.01–0.1.

6. The process of claim 5 wherein the vanadium compound is added at a rate such as to provide a flow constant of about 0.025–0.05.

7. The process of claim 1 wherein the organometallic compound is employed in an amount such as to provide at least about one mol of organometallic compound per mol of surface hydroxyl groups.

8. The process of claim 1 wherein the organometallic compound is employed in an amount such as to provide less than about one mol of organometallic compound per mol of surface hydroxyl groups.

9. The process of claim 8 wherein the organometallic compound is also added to the agitated inorganic oxide slurry at a rate such as to ensure its substantially uniform distribution on the particles as it reacts therewith.

10. The process of claim 1 wherein the support is an inorganic oxide selected from the group consisting of silica, alumina, magnesia, and mixtures thereof.

11. The process of claim 10 wherein the inorganic oxide is silica.

12. The process of claim 1 wherein the inert liquid hydrocarbon is a saturated hydrocarbon boiling in the $C_4$–$C_8$ range.

13. The process of claim 12 wherein the inert liquid hydrocarbon is isobutane.

14. The process of claim 12 wherein the inert liquid hydrocarbon is a pure or commercial hexane.

15. The process of claim 3 in which the catalyst is dried in the same vessel in which the slurry and reaction steps are conducted.

16. The process of claim 1 wherein the organometallic compound is a compound corresponding to the formula $RAlR'R''$, wherein at least one of the R, R', and R'' substituents is an alkyl group containing 1 to 12 carbon atoms and the remaining substituents are independently selected from the group consisting of hydrogen and alkyl and alkoxy groups containing 1 to 12 carbon atoms.

17. The process of claim 12 wherein the organometallic compound is a trialkylaluminum.

18. The process of claim 17 wherein the trialkylaluminum is triethylaluminum.

19. The process of claim 17 wherein the trialkylaluminum is tri-n-hexylaluminum.

20. The process of claim 1 wherein the vanadium component comprises at least one vanadium compound corresponding to a formula selected from $(RO)_nVOX_{3-n}$ and $(RO)_mVX_{4-m}$, in which formulas R represents a $C_1$–$C_{18}$ monovalent hydrocarbon radical that is free of aliphatic unsaturation, X is Cl or Br, n has a value of 0 to 3, and m has a value of 0 to 4.

21. The process of claim 20 wherein the vanadium compound is a compound corresponding to the formula $(RO)_nVOCl_{3-n}$.

22. The process of claim 21 wherein n has a value of 0.

23. The process of claim 21 wherein R is alkyl and n has a value of about 1.

24. The process of claim 20 wherein the vanadium compound is a compound corresponding to the formula $(RO)_mVCl_{4-m}$.

25. The process of claim 24 wherein m has a value of 0.

26. The process of claim 1 wherein the reactants are employed in amounts such as to provide about 5 to 30 mols of organometallic compound per mol of vanadium compound.

27. The process of claim 26 wherein the inorganic oxide is silica, the inert liquid hydrocarbon is a saturated hydrocarbon boiling in the $C_4$–$C_8$ range, the organometallic compound is a trialkylaluminum, the vanadium compound is $VOCl_3$, the amounts of organometallic and vanadium compounds employed are less than those required to react with substantially all of the reactive sites on the particles in the slurry, and the $VOCl_3$ is added at a rate such as to provide a flow constant of about 0.025–0.05.

* * * * *

UNITED STATES PATENT AND TRADEMARK OFFICE
CERTIFICATE OF CORRECTION

PATENT NO. : 4,426,317
DATED : January 17, 1984
INVENTOR(S) : Thomas K. Rogers

It is certified that error appears in the above—identified patent and that said Letters Patent are hereby corrected as shown below:

Claim 1, line 6, delete "and" and substitute therefore --- the ----

Signed and Sealed this

Twenty-sixth Day of February 1985

[SEAL]

Attest:

DONALD J. QUIGG

Attesting Officer

Acting Commissioner of Patents and Trademarks